United States Patent
Keeker et al.

(10) Patent No.: US 9,433,855 B1
(45) Date of Patent: Sep. 6, 2016

(54) SOCIAL GAME SYSTEMS AND METHODS

(75) Inventors: Kevin Keeker, San Francisco, CA (US); Christian Selchau-Hansen, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/528,741

(22) Filed: Jun. 20, 2012

Related U.S. Application Data

(60) Provisional application No. 61/548,555, filed on Oct. 18, 2011.

(51) Int. Cl.
*A63F 9/00* (2006.01)
*A63F 13/00* (2014.01)

(52) U.S. Cl.
CPC ........ *A63F 13/00* (2013.01); *A63F 2300/6036* (2013.01)

(58) Field of Classification Search
None
See application file for complete search history.

(56) References Cited

U.S. PATENT DOCUMENTS

| | | | |
|---|---|---|---|
| 5,964,660 A | 10/1999 | James et al. | |
| 6,179,713 B1 | 1/2001 | James et al. | |
| 6,884,169 B2 | 4/2005 | Tsuchida et al. | |
| 7,950,845 B1 | 5/2011 | Syed et al. | |
| 8,231,470 B2* | 7/2012 | Feeney et al. | 463/42 |
| 8,357,045 B2* | 1/2013 | Youm et al. | 463/42 |
| 2002/0198050 A1* | 12/2002 | Patchen | 463/40 |
| 2006/0046810 A1 | 3/2006 | Tabata | |
| 2007/0060380 A1* | 3/2007 | McMonigle et al. | 463/42 |
| 2007/0082738 A1* | 4/2007 | Fickie et al. | 463/42 |
| 2007/0169165 A1* | 7/2007 | Crull et al. | 725/135 |
| 2007/0226062 A1* | 9/2007 | Hughes et al. | 705/14 |
| 2008/0172243 A1* | 7/2008 | Kelly | 705/1 |
| 2008/0176655 A1* | 7/2008 | James et al. | 463/42 |
| 2009/0325696 A1* | 12/2009 | Gross | 463/31 |
| 2010/0099471 A1* | 4/2010 | Feeney et al. | 463/1 |
| 2010/0160038 A1* | 6/2010 | Youm et al. | 463/29 |
| 2011/0229860 A1* | 9/2011 | Leventhal et al. | 434/107 |
| 2012/0058808 A1* | 3/2012 | Lockton | 463/9 |
| 2013/0225285 A1* | 8/2013 | Lockton | 463/29 |

* cited by examiner

*Primary Examiner* — Seng H Lim
(74) *Attorney, Agent, or Firm* — Schwegman Lundberg & Woessner, P.A.

(57) ABSTRACT

Systems and methods that provide online social game contests are described. In some embodiments, a method determines a start time and an end point associated with an online social game contest. Multiple users participating in the online game contest are identified, and the contest is initiated at the start time. Each of the multiple users has a separate online social game environment in which they participate in the contest. The online social game contest ends upon reaching the end point.

15 Claims, 7 Drawing Sheets

| User Name | Contest Score | Population Level | Number of Skyscrapers | Contest Rank |
|---|---|---|---|---|
| John W. | 228 | 870 | 2 | 1 |
| Amy I. | 212 | 705 | 2 | 2 |
| Karen K. | 198 | 900 | 0 | 3 |
| George D. | 195 | 770 | 1 | 4 |
| Bob G. | 174 | 720 | 1 | 5 |

FIG. 5

SOCIAL GAME SYSTEMS AND METHODS

RELATED APPLICATION

This application also claims the priority benefit of U.S. Provisional Application Ser. No. 61/548,555, entitled "Social game systems and methods", filed Oct. 18, 2011, the disclosure of which is incorporated by reference herein in its entirety.

TECHNICAL FIELD

The present disclosure generally relates to games and applications in general and, in particular embodiments, to computer-implemented, online social games.

BACKGROUND

The popularity of computer-implemented games is increasing. Additionally, many computer-implemented games include a social component such that multiple users who have a social connection with one another may share game strategies and game experiences. However, a user's interest in a game may decline after a period of time. Further, if a particular user starts playing a game after a friend has significant experience with the game, the user may become frustrated in trying to "catch up" with their friend. This frustration may result in the user abandoning the game.

BRIEF DESCRIPTION OF THE DRAWINGS

FIG. 5 illustrates an example of data entries associated with a game contest.

DESCRIPTION OF EXAMPLE EMBODIMENTS

The systems and methods described herein allow multiple users to compete in a game contest, game tournament, game event or other game-related activity in which two or more users compete against one another. In the described embodiments, multiple users compete against one another in the same online social game, but all users start the game contest with the same game configuration. Thus, even if users have previously played the online social game, for purposes of the game contest, each user starts with the same game configuration and same game settings. Further, although the multiple users are playing the same online social game, each user competes using their own game board (or game environment). The multiple users may compete against each other, or compete with other members of their team, while using their own separate game environment. Various rules and scoring procedures, discussed herein, are associated with a particular game contest. In some embodiments, a game contest implements an online social game that is typically a persistent game (i.e., no end point). However, for purposes of the game contest, the persistent game has a predefined end point such that the game contest terminates when the predefined end point is reached.

Figure 1:
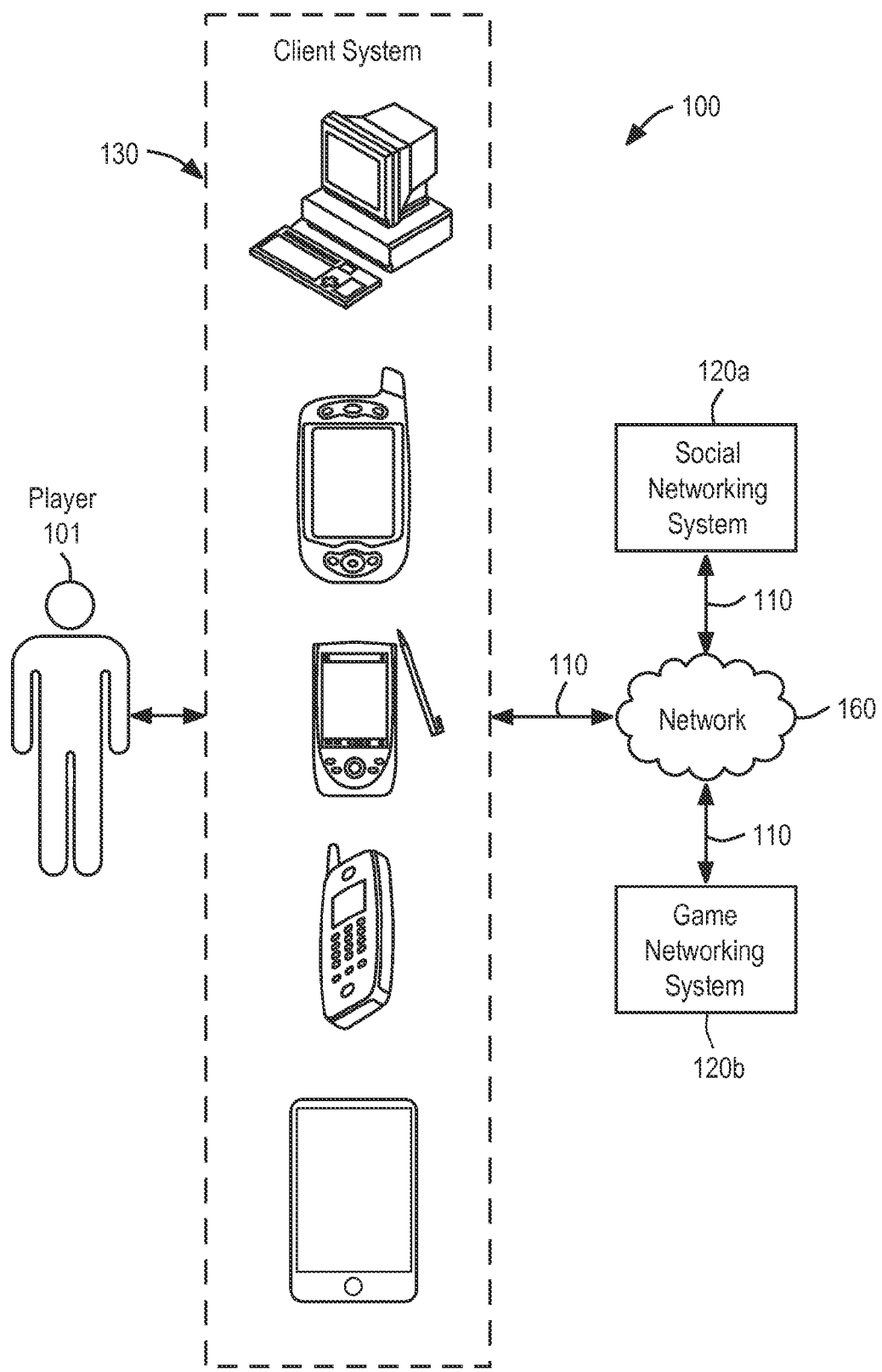
FIG. 1 illustrates an example of a system for implementing particular disclosed embodiments.

FIG. 1 illustrates an example of a system for implementing various disclosed embodiments. In particular embodiments, system 100 comprises player 101, social networking system 120a, game networking system 120b, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 120a is a network-addressable computing system that can host one or more social graphs. Social networking system 120a can generate, store, receive, and transmit social networking data. Social networking system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accessed by the other components of system 100 either directly or via network 160. Player 101 may use client system 130 to access, send data to, and receive data from social networking system 120a and game networking system 120b. Client system 130 can access social networking system 120a or game networking system 120b directly, via network 160, or via a third-party system. As an example and not by way of limitation, client system 130 may access game networking system 120b via social networking system 120a. Client system 130 can be any suitable computing device, such as a personal computer, laptop, cellular phone, smart phone, computing tablet, and the like.

Although FIG. 1 illustrates a particular number of players 101, social networking systems 120a, game networking systems 120b, client systems 130, and networks 160, this disclosure contemplates any suitable number of players 101, social networking systems 120a, game networking systems 120b, client systems 130, and networks 160. As an example and not by way of limitation, system 100 may include one or more game networking systems 120b and no social networking systems 120a. As another example and not by way of limitation, system 100 may include a system that comprises both social networking system 120a and game networking system 120b. Moreover, although FIG. 1 illustrates a particular arrangement of player 101, social networking system 120a, game networking system 120b, client system 130, and network 160, this disclosure contemplates any suitable arrangement of player 101, social networking system 120a, game networking system 120b, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 120a, game networking system 120b, client system 130, and network 160, this disclosure contemplates any suitable connections between player 101, social networking system 120a, game networking system 120b, client system 130, and network 160. As an example and not by way of limitation, in particular embodiments, client system 130 may have a direct connection to social networking system 120a or game networking system 120b, bypassing network 160.

Online Games and Game Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 120b, which can be accessed using any suitable connection with a suitable client system 130. A player 101 may have a game account on game networking system 120b, wherein the game account can contain a variety of information associated with the player 101 (e.g., the player's personal information, financial information, purchase history, player character state, game state). In some embodiments, the player 101 may play multiple games on game networking system 120b, which may maintain a single game account for the player 101 with respect to all the games, or multiple individual game accounts for each game with respect to the player 101. In some embodiments, game networking system 120b can assign a unique identifier to each player 101 of an online game hosted on game networking system 120b. Game networking system 120b can determine that a player 101 is accessing the online game by reading the user's cookies, which may be appended to HTTP requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmit user inputs or other events to the game engine, and receive instructions from the game engine. The game engine can be executed on any suitable system (such as, for example, client system 130, social networking system 120a, or game networking system 120b). As an example and not by way of limitation, client system 130 can download client components of an online game, which are executed locally, while a remote game server, such as game networking system 120b, provides backend support for the client components and may be responsible for maintaining application data of the game, processing the inputs from the player 101, updating and/or synchronizing the game state based on the game logic and each input from the player 101, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120b.

In an online multiplayer game, players may control player characters (PCs), a game engine controls non-player characters (NPCs) and game features, and the game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), and so forth. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player 101.

In particular embodiments, player 101 may access particular game instances of an online game. A game instance is a copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players 101. A game instance is associated with a specific player 101 when one or more game parameters of the game instance are associated with the specific player 101. As an example and not by way of limitation, a game instance associated with a first player 101 may be named "First Player's Play Area." This game instance may be populated with the first player's PC and one or more in-game objects associated with the first player 101. In particular embodiments, a game instance associated with a specific player 101 may only be accessible by that specific player 101. As an example and not by way of limitation, a first player 101 may access a first game instance when playing an online game, and this first game instance may be inaccessible to all other players 101. In other embodiments, a game instance associated with a specific player 101 may be accessible by one or more other players, either synchronously or asynchronously with the specific player's game play. As an example and not by way of limitation, a first player 101 may be associated with a first game instance, but the first game instance may be accessed by all first-degree friends in the first player's social network. In particular embodiments, the game engine may create a specific game instance for a specific player 101 when that player 101 accesses the game. As an example and not by way of limitation, the game engine may create a first game instance when a first player 101 initially accesses an online game, and that same game instance may be loaded each time the first player 101 accesses the game. As another example and not by way of limitation, the game engine may create a new game instance each time a first player 101 accesses an online game, wherein each game instance may be created randomly or selected from a set of predetermined game instances. In particular embodiments, the set of in-game actions available to a specific player 101 may be different in a game instance that is associated with that player 101 compared to a game instance that is not associated with that player 101. The set of in-game actions available to a specific player in a game instance associated with that player 101 may be a subset, superset, or independent of the set of in-game actions available to that player 101 in a game instance that is not associated with him. As an example and not by way of limitation, a first player 101 may be associated with Blackacre Farm in an online farming game. The first player 101 may be able to plant crops on Blackacre Farm. If the first player 101 accesses a game instance associated with another player 101, such as Whiteacre Farm, the game engine may not allow the first player 101 to plant crops in that game instance. However, other in-game actions may be available to the first player 101, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, and the like). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure includes any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within $N_{max}$ degrees of the player, where $N_{max}$ is the maximum degree of separation allowed by the system managing the social graph (such as, for example, social networking system 120a or game networking system 120b). In one embodiment, $N_{max}$ equals 1, such that the player's social network includes only first-degree friends. In another embodiment, $N_{max}$ is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., Facebook®, Friendster, Myspace). In yet other embodiments, player 101 has a social network on both game networking system 120b and social networking system 120a, wherein player 101 can have a social network on the game networking system 120b that is a subset, superset, or independent of the player's social network on social networking system 120a. In such combined systems, game network system 120b can maintain social graph information with edge type attributes that indicate whether a given friend is an "in-game friend," an "out-of-game friend," or both. The various embodiments disclosed herein are operable when the social graph is managed by social networking system 120a, game networking system 120b, or both.

Figure 2:
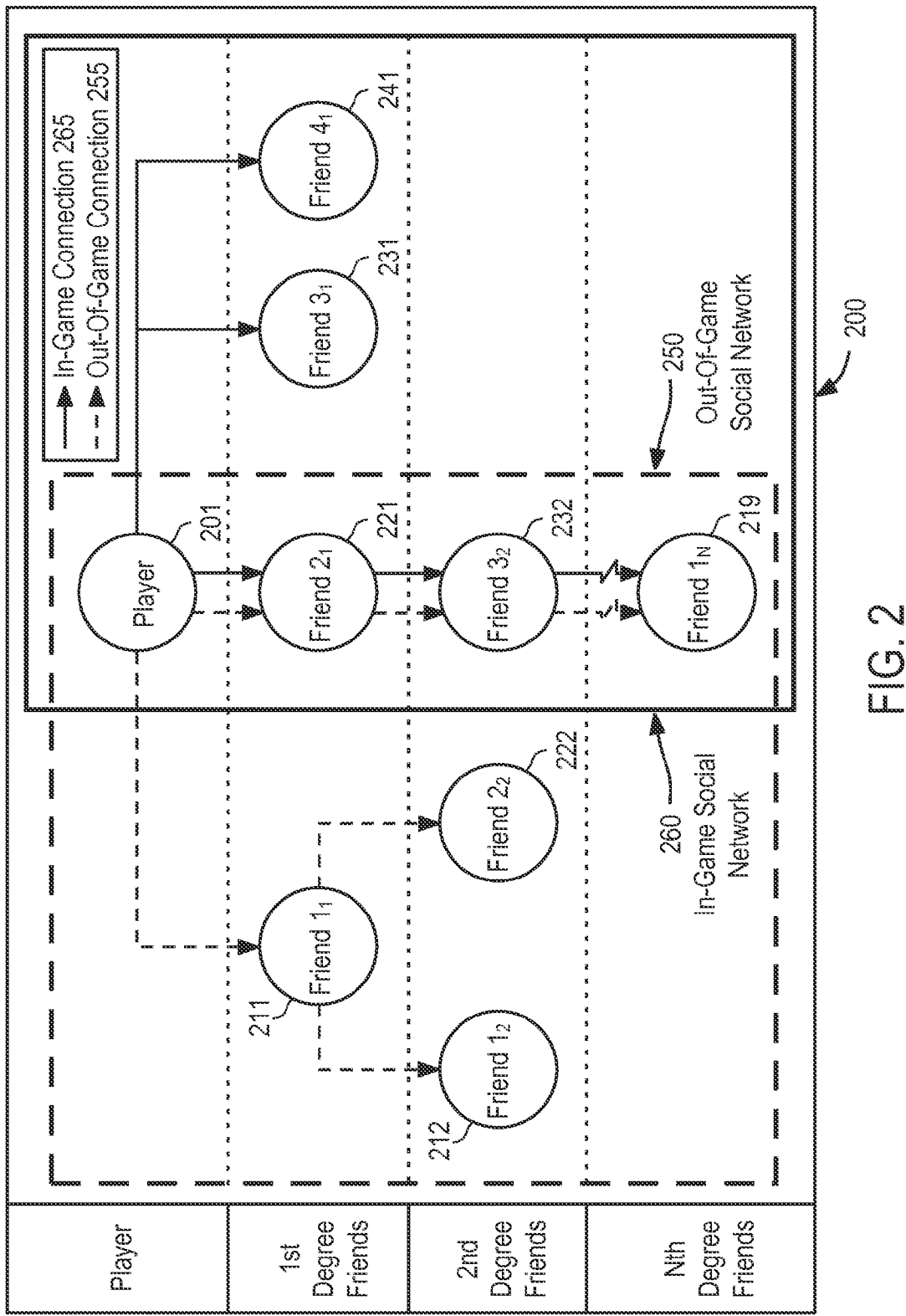
FIG. 2 illustrates an example social network.

FIG. 2 shows an example of a social network within a social graph. As shown, Player 201 can be associated, connected or linked to various other users, or "friends," within the social network 250. These associations, connections or links can track relationships between users within the social network 250 and are commonly referred to as online "friends" or "friendships" between users. Each friend or friendship in a particular user's social network within a social graph is commonly referred to as a "node." For purposes of illustration and not by way of limitation, the details of social network 250 will be described in relation to Player 201. As used herein, the terms "player" and "user" can be used interchangeably and can refer to any user or character in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to which he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 120a.

In various embodiments, Player 201 can have Nth-degree friends connected to him through a chain of intermediary degree friends as indicated in FIG. 2. For example, Nth-degree Friend $1_N$ 219 is connected to Player 201 via second-degree Friend $3_2$ 232 and one or more other higher-degree friends. Various embodiments may take advantage of and utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out of game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access in-game social network 260, out-of-game social network 250, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Figure 3:
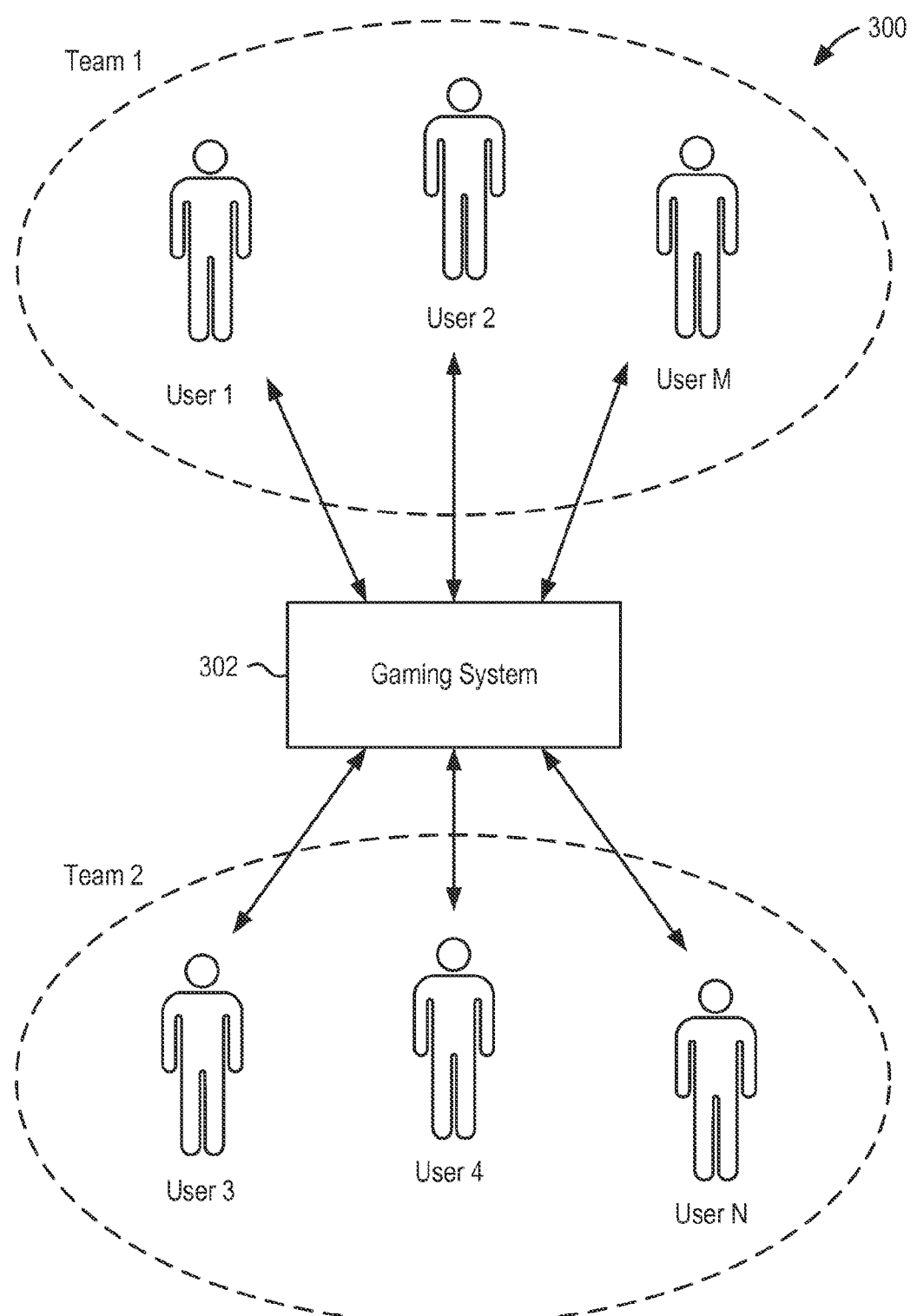
FIG. 3 illustrates an example environment in which multiple users compete in a game.

FIG. 3 illustrates an example environment 300 in which multiple users compete in a game contest or other game activity. In the described embodiments, the games do not require direct competition on a shared game board or shared game environment. Instead, multiple users compete against one another each using their own game board (or their own game environment). Initially, these game boards are the same (all contest participants start the game at the same point), but may differ significantly from other users' game boards as the game progresses. These embodiments support competition that is both direct and indirect. Additionally, each user is not competing directly for the same set of limited and/or shared resources. Instead, each user has access to their own pool of resources, including shared resources. In particular embodiments, the game competition is supported by one or more social networks. These embodiments permit social game play among the multiple users as supported by the one or more social networks. Additionally, as described herein, these embodiments provide an end point for social games that do not typically have an end point. This end point may be associated with a particular time or achieving specific game-related goals or activities.

In the example of FIG. 3, two teams (labeled "Team 1" and "Team 2") are competing against one another in a game implemented by a gaming system 302. In some embodiments, gaming system 302 includes a game networking system, such as game networking system 120b shown in FIG. 1. Each team includes multiple users (or "players"). A particular team may include any number of users. In the example of FIG. 3, Team 1 includes User 1, User 2, and User M, while Team 2 includes User 3, User 4, and User N. In specific embodiments, a particular game may restrict teams to a certain size, such as a maximum of ten users. The teams compete against one another to earn points, reach particular levels within the game or perform certain activities in the game. In particular embodiments, the teams compete to achieve results based on any measurable game metric, game statistic, and the like. Users on a particular team may develop strategies and procedures to maximize the team's performance by, for example, exchanging gifts within the game between the users. Example gifts include supplies, energy, game currency, tools, powers/abilities, reputation, level of mastery, experience points, skills, and so forth. Alternatively, users on a particular team may share collective resources, supplies, and other items of value in the game, or assist each other's play by performing other various in-game actions. Example actions include cooperating to achieve game goals (such as working together to create a building) and combining strengths or efforts between two or more players. Further, users on a particular team can visit team members who are "neighbors" in the game, join a war or battle, or defend a neighbor. Although two teams are shown in FIG. 3, any number of teams may compete against one another in a particular game. Additional details regarding game rules, game scoring, and game operation are discussed herein.

Although the example of FIG. 3 illustrates two teams competing against one another, in alternate embodiments users may compete against one another individually. For example, multiple users may access a game through gaming system 302 and compete against other individual users to earn points, reach particular game levels or complete particular activities in the game.

The example environment shown in FIG. 3 allows users and teams to compete synchronously and/or asynchronously using, for example, the social networking systems and game networking systems discussed herein. When competing asynchronously, users and teams are competing against one another, but they do not need to be actively participating at the same time. For example, a first user can play at one time on a particular day and another user in the same game contest can play at a different time on the same day (or play on a different day). Thus, the example environment shown in FIG. 3 allows users and teams to compete in a social setting without requiring each user to participate at a specific day or time. In some embodiments, synchronous and asynchronous competition may coexist within the same game or the same game play session, such as when players from either team happen to be playing online at the same time.

In specific implementations, the game associated with the game contest is a persistent game (e.g., a game that does not have an associated end time or end point). In typical persistent games, game play continues indefinitely as users continue to advance in the game by, for example, building cities, harvesting crops, and performing other activities. When implementing a game contest, the same persistent game is used, but a time limit and/or end point is associated with the game for purposes of the game contest. Thus, users can play a persistent game that has been modified to include a defined end point. If users have previously played the persistent game, they have a chance to use new strategies in a game contest based on the same persistent game. Further, users can apply knowledge gained while previously playing the persistent game to achieve improved results in a game contest based on the same persistent game. Additional details regarding the time limit and/or end point associated with a game contest are discussed herein.

In particular embodiments, multiple users or multiple teams are organized into leagues. Each league may have a different level of difficulty (e.g., a league for beginning skill levels, intermediate skill levels, and advanced skill levels). Individual users or teams can move between different leagues based on their skill level, performance in game contest, and the like.

Users participating in game contests (either individually or as members of a team) may also play the same game(s) in a non-contest mode. For example, a user may have been playing Zynga® CityVille for a period of time and developed a city. This user can enter a Zynga® CityVille game contest without affecting the previously-developed city. By entering the Zynga® CityVille game contest, the user starts at the beginning of the game with a new city and competes in the game contest using that new city. In this example, each user in the contest starts the game at the same point (or the same level) with the same resources. Thus, regardless of the user's previous game play performance, each user in the game contest starts at the same place in the game. The "starting point" in a game for a particular game contest may be the beginning of the game or may be a predefined initial game state that has progressed beyond the beginning of the game (e.g., a partially-developed city or predefined in-game assets such as strength, virtual currency, experience points, tools, and the like).

In some embodiments, the multiple users may compete against each other, or compete with other members of their team, while using their own separate game environment. Thus, each of the multiple users has access to their own pool of resources and is not necessarily competing with other users for the same set of game resources. As discussed herein, the competition between the multiple users, or teams of users, may be facilitated by one or more social networks.

Figure 4:
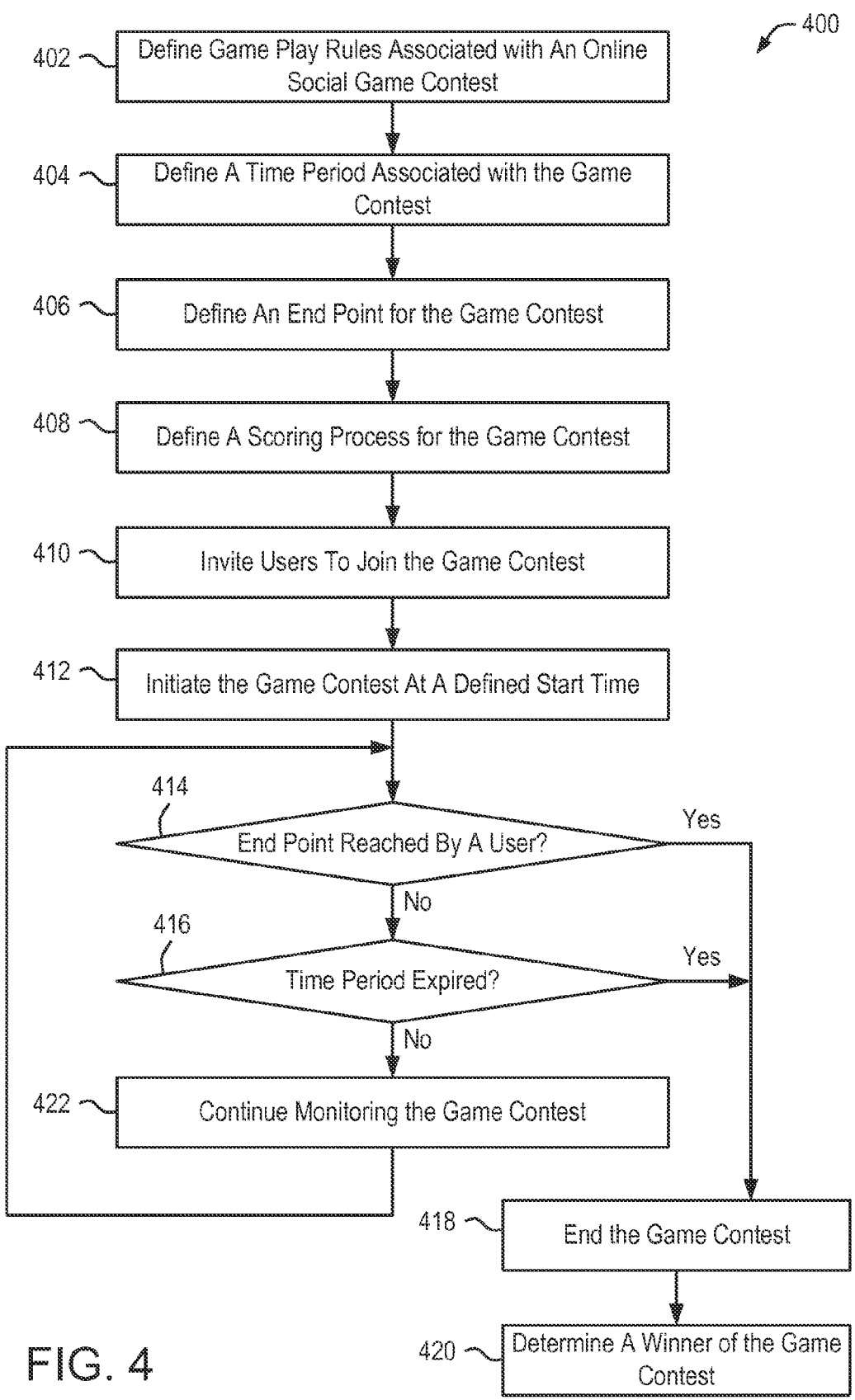
FIG. 4 is a flow diagram illustrating an example procedure for implementing a game contest.

FIG. 4 is a flow diagram illustrating an example procedure 400 for implementing a game contest. In particular embodiments, procedure 400 is implemented using one or more processors. The game contest may include multiple users competing against one another individually or may include multiple teams (or groups) of users, where each team competes against one or more other teams. The game contest can be initiated by an individual user, a gaming system operator or administrator, or another user or entity, or by the game itself. The game contest can be initiated by a user or entity actively playing the game or by a user or entity that is not involved in playing the game. Additionally, the game contest can be initiated by a computing system or gaming system in a scheduled or random manner.

Procedure 400 begins by defining game play rules associated with a particular game contest at 402. The game play rules include, for example, what resources can be shared among team members, how the game is scored, how game activities are performed, how to achieve new levels, how a game winner is determined, and the like. In particular embodiments, the game play rules may define the amount of game currency or other resources a user can "spend" during the game contest. For example, each user may receive 100 coins to spend during the game contest. The coins are used to purchase goods, services or other resources used in the game. Additionally, the game play rules may limit the amount of game currency or other resources a user can spend during a particular time period of the game contest. For example, each user may be limited to spending a maximum of 25 coins during a 24-hour period within the game contest. In some embodiments, a rule associated with a game contest defines the amount of actual money a user can spend during the game contest. For example, each user may be limited to spending $20.00 of actual money during the game contest to purchase goods, services or other resources used during the game contest. This "actual money" is real money, for example, paid from a user's bank account or charged to a credit card. This "actual money" is different from the "game currency" or "virtual currency" discussed herein. In some embodiments, actual money is used to purchase game currency or virtual currency. Additional game play rules may define other game constraints, such as speed of time, laws of physics, and the like.

The game play rules for a particular game contest may differ from the non-contest version of the game. For example, the game play rules for a game contest may increase the difficulty of certain portions of the game or decrease the difficulty of certain portions of the game. Each game contest may have different game play rules to introduce game variations and new challenges to the contest participants.

Procedure 400 also defines a time period associated with the game contest at 404. For example, a particular game contest may start and end at particular times (e.g., start on Monday at 2:00 pm Pacific and end on Wednesday at 10:00 pm Pacific). Procedure 400 further defines an end point for the game contest at 406. The end point may include, for example, achieving a particular score or reaching a specific threshold, such as reaching level 10 in the game, completing ten skyscraper buildings or completing a predefined series of activities/tasks. Alternatively, the end point may be the end time of the game, such as Wednesday at 10:00 pm Pacific. In a particular embodiment, the end point is the earlier of: (1) the end time of the game; or (2) achieving a particular score or reaching a specific threshold. In embodiment (2), the game ends when a particular score or threshold is reached. If that score or threshold is not reached by any user or team at the end time of the game, then the winner is determined based on the game play rules (e.g., the user or team with the highest score at the end time). In alternate embodiments, the end point for the game contest is based on any game metric, game event, and the like.

Procedure 400 also defines a scoring process for the game contest at 408. In various embodiments, the scoring is based on one or more game play metrics and/or statistics. For example, scoring may take into account a number of coins accumulated in the game, a level or ranking in the game, a number of crops harvested, a number of buildings completed, an experience level (or mastery level) achieved, and the like. The scoring process can include any number of game metrics or game statistics that are measured or tracked by the gaming system. There could, in some embodiments, be multiple scoring processes, with multiple success conditions in which multiple players each are winners at different scoring conditions (e.g., bronze, silver, gold; or richest player, most experienced player, greatest architect, and so forth). In other embodiments, the scoring process for the game contest is based, at least partially, on voting by one or more users, such as contest participants and/or non-contest participants. This voting can be facilitated, for example, through one or more social networks. In particular implementations, votes are cast for subjective opinions, such as prettiest city, best utilization of resources, best team player, and the like.

The various game contest parameters discussed herein may be defined or controlled by one or more players participating in the game contest, one or more players administering the game contest (but not participating in the game contest), an entity facilitating the game contest, or any other entity or user. In some embodiments, the game contest parameters are defined or controlled in a random manner or by one or more algorithms. For example, an algorithm may implement a particular game contest by automatically selecting game contest parameters from one or more lists of available settings (such as lists of game play rules, time periods, end points, and the like).

In some embodiments, the scoring process for the game contest includes a participant handicapping system. For example, certain participants with less experience playing the game involved in the game contest may receive a better initial allocation of goods, services or other resources having value in the game. Alternatively, participants with greater experience playing the game involved in the game contest may receive a lesser allocation of goods, services or other resources. The handicapping system may also give certain participants other advantages or disadvantages, such as different end points for the game contest, different scoring processes, and the like.

After defining various game contest parameters, procedure 400 invites users to join the game at 410. Users can be invited by other users, by a gaming system operator or administrator, or by any other person, entity or system. Procedure 400 then, at 412, initiates the game contest at the defined start time. The procedure continues by monitoring the game to determine whether an end point is reached by a single user, multiple users or a team at 414, or whether the time period for the game contest has expired at 416. If an end point is reached by a user or team at 414, procedure 400 ends the game contest at 418 and determines a winner of the game contest at 420 based on, for example, the previously defined game play rules, the end point for the game contest, and the scoring process for the game contest.

If procedure 400 determines that the time period for the game contest has expired at 416, the procedure ends the game contest at 418 and determines a winner of the game contest at 420 based on, for example, the previously defined game play rules, end point for the game contest, and scoring process for the game contest. If an end point is not reached and the time period for the game contest has not expired, procedure 400 continues the game contest at 422. In this situation, the procedure continues monitoring the game until an end point is reached by a single user, multiple users or a team, or the time period for the game contest expires.

In some embodiments, the online social game contest defined at 402 requires user participation across multiple games. For example, a game contest may require participants to reach a particular level or perform certain activities in each of the multiple games, such as building five skyscrapers in a city building game, building an army of five hundred in a military game, and reaching "level 10" in an adventure game. The first participant to complete all three of these activities is determined the winner of the game contest. For game contests involving multiple games, the game play rules for the game contest may define specific game play rules, scoring processes, and the like for each of the multiple games.

FIG. 5 illustrates an example of data entries in a data table 500 associated with a game contest. In this example, data entries associated with five users in the game contest are shown. In particular embodiments, any number of data entries may be associated with a game contest. FIG. 5 displays data associated with a user name, a contest score, a city population level, a number of skyscrapers, and a contest rank. In a particular game contest, the contest score is determined based on the user's population level achieved and the number of skyscraper buildings completed. In other game contests, various other data are associated with users participating in a particular game contest based on the scoring process for the contest, game play rules for the contest, and the like.

At least a portion of the data shown in the data table 500 is also used to generate one or more contest "leaderboards" that shows the score and/or ranking of the top users in the game contest on different scoring dimensions or amongst different playing populations (e.g., winning teams, winning individuals, winner amongst social network friends, most experience points, and the like). The contest leaderboard is updated periodically based on changes in user scores and other factors. In particular embodiments, the contest leaderboard shows a user name and contest rank for the top users in the game contest (e.g., the top 10 users). In other embodiments, the contest leaderboard shows additional data associated with each of the top users, such as their contest score or other factors in the scoring process (e.g., city population level and number of skyscrapers completed).

In one embodiment, a leaderboard aggregates results from multiple game contests. In this embodiment, the leaderboard displays user rankings or ratings based on user performance in multiple game contests. The user performance may be associated with contests related to a particular game or with contests associated with multiple games. For example, a Zynga® CityVille leaderboard displays user rankings associated with user performance in Zynga® CityVille game contests. In another example, a Master Gamer leaderboard displays user rankings associated with user performance in multiple game contests, such as Zynga® CityVille game contests, Zynga® FarmVille game contests, and Zynga® Mafia Wars game contests. Leaderboard rankings can be based on, for example, the number of contest wins, the results of multiple game contests, or the other achievements associated with one or more games (or game contests).

Figure 6:
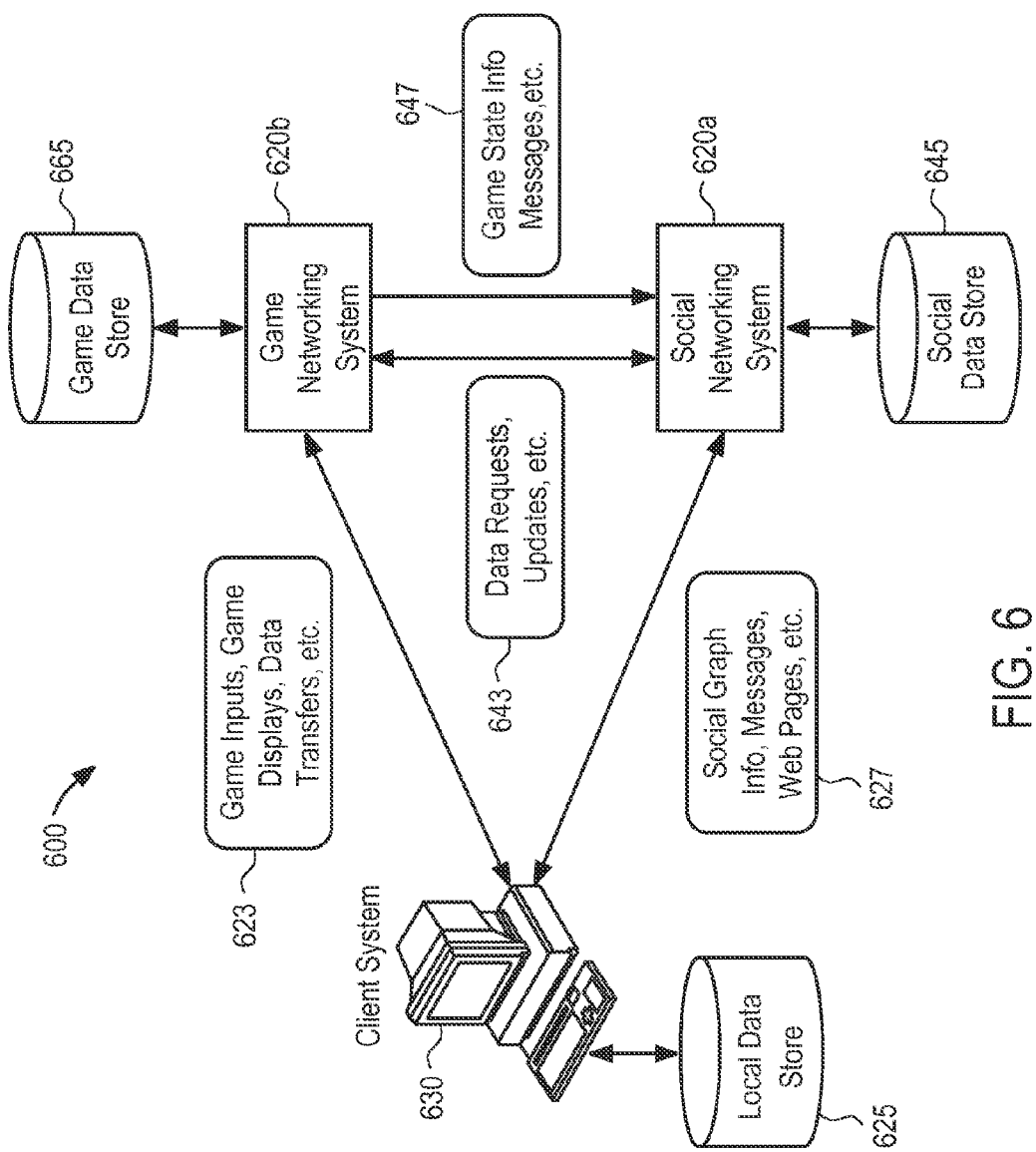
FIG. 6 illustrates an example data flow in a system.

FIG. 6 illustrates an example data flow between the components of system 600. In particular embodiments, system 600 can include client system 630, social networking system 620*a*, and game networking system 620*b*. The components of system 600 can be connected to each other in any suitable configuration, using any suitable type of connection. The components may be connected directly or over any suitable network. Client system 630, social networking system 620*a*, and game networking system 620*b* can each have one or more corresponding data stores such as local data store 625, social data store 645, and game data store 665, respectively. Social networking system 620*a* and game networking system 620*b* can also have one or more servers that can communicate with client system 630 over an appropriate network. Social networking system 620*a* and game networking system 620*b* can have, for example, one or more internet servers for communicating with client system 630 via the Internet. Similarly, social networking system 620*a* and game networking system 620*b* can have one or more mobile servers for communicating with client system 630 via a mobile network (e.g., GSM, PCS, Wi-Fi, WPAN, and the like). In some embodiments, one server may be able to communicate with client system 630 over both the Internet and a mobile network. In other embodiments, separate servers can be used.

Client system 630 can receive and transmit data 623 to and from game networking system 620*b*. This data can include, for example, webpages, messages, game inputs, game displays, HTTP packets, data requests, transaction information, updates, and other suitable data. At some other time, or at the same time, game networking system 620*b* can communicate data 643, 647 (e.g., game state information, game system account information, page info, messages, data requests, updates, and so forth) with other networking systems, such as social networking system 620*a* (e.g., Facebook®, Myspace, and the like). Client system 630 can also receive and transmit data 627 to and from social networking system 620*a*. This data can include, for example, webpages, messages, social graph information, social network displays, HTTP packets, data requests, transaction information, updates, and other suitable data.

Communication between client system 630, social networking system 620*a*, and game networking system 620*b* can occur over any appropriate electronic communication medium or network using any suitable communications protocols. For example, client system 630, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols. In addition, a server in one interaction context may be a client in another interaction context. In particular embodiments, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 620*b*, the BLOB containing the game state for the instance corresponding to the player can be transmitted to client system 630 for use by a client-side executed object to process. In particular embodiments, the client-side executable may be a FLASH-based game, which can de-serialize the game state data in the BLOB. As a player plays the game, the game logic implemented at client system 630 maintains and modifies the various game state parameters locally. The client-side game logic may also batch game events, such as mouse clicks, and transmit these events to game networking system 620*b*. Game networking system 620*b* may itself operate by retrieving a copy of the BLOB from a database or an intermediate memory cache (memcache) layer. Game networking system 620*b* can also de-serialize the BLOB to resolve the game state parameters and execute its own game logic based on the events in the batch file of events transmitted by the client to synchronize the game state on the server side. Game networking system 620*b* may then re-serialize the game state, now modified, into a BLOB and pass this to a memory cache layer for lazy updates to a persistent database.

With a client-server environment in which the online games may run, one server system, such as game networking system 620*b*, may support multiple client systems 630. At any given time, there may be multiple players at multiple client systems 630, all playing the same online game. In practice, the number of players playing the same game at the same time may be very large. As the game progresses with each player, multiple players may provide different inputs to the online game at their respective client systems 630, and multiple client systems 630 may transmit multiple player inputs and/or game events to game networking system 620*b* for further processing. In addition, multiple client systems 630 may transmit other types of application data to game networking system 620*b*.

In particular embodiments, a computer-implemented game may be a text-based or turn-based game implemented as a series of web pages that are generated after a player selects one or more actions to perform. The web pages may be displayed in a browser client executed on client system 630. As an example and not by way of limitation, a client application downloaded to client system 630 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF (Small Web Format) object that is embedded in a web page and executable by a Flash media player plug-in. In particular embodiments, one or more described webpages may be associated with or accessed by social networking system 620*a*. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 630, either caused by an action of a game player or by the game logic itself, client system 630 may need to inform game networking system 620b of the update. For example, if the game is a farming game with a harvest mechanic (such as Zynga® FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 600 is discussed in reference to updating a multi-player online game hosted on a network-addressable system (such as, for example, social networking system 620a or game networking system 620b), where an instance of the online game is executed remotely on a client system 630, which then transmits application event data to the hosting system such that the remote game server synchronizes game state associated with the instance executed by the client system 630.

In particular embodiments, one or more objects of a game may be represented as an Adobe® Flash (or other authoring environment, such as HTML5) object. Flash may manipulate vector and raster graphics, and supports bidirectional streaming of audio and video. "Flash" may mean the authoring environment, the player, or the application files. In particular embodiments, client system 630 may include a Flash client. The Flash client may be configured to receive and run Flash application or game object code from any suitable networking system (such as, for example, social networking system 620a or game networking system 620b). In particular embodiments, the Flash client may be run in a browser client executed on client system 630. A player can interact with Flash objects using client system 630 and the Flash client. The Flash objects can represent a variety of in-game objects. Thus, the player may perform various in-game actions on various in-game objects by make various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 630, the Flash client may send the events that caused the game state changes to the in-game object to game networking system 620b. However, to expedite the processing and hence the speed of the overall gaming experience, the Flash client may collect a batch of some number of events or updates into a batch file. The number of events or updates may be determined by the Flash client dynamically or determined by game networking system 620b based on server loads or other factors. For example, client system 630 may send a batch file to game networking system 620b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 630. In particular embodiments, the batch file may be a text file and the name-value pairs may be in string format.

In particular embodiments, when a player plays an online game on client system 630, game networking system 620b may serialize all the game-related data, including, for example and without limitation, game states, game events, user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 620b may retrieve the corresponding BLOB from the database to determine the most-recent values of the game-related data. In particular embodiments, while a player is playing the online game, game networking system 620b may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 7:
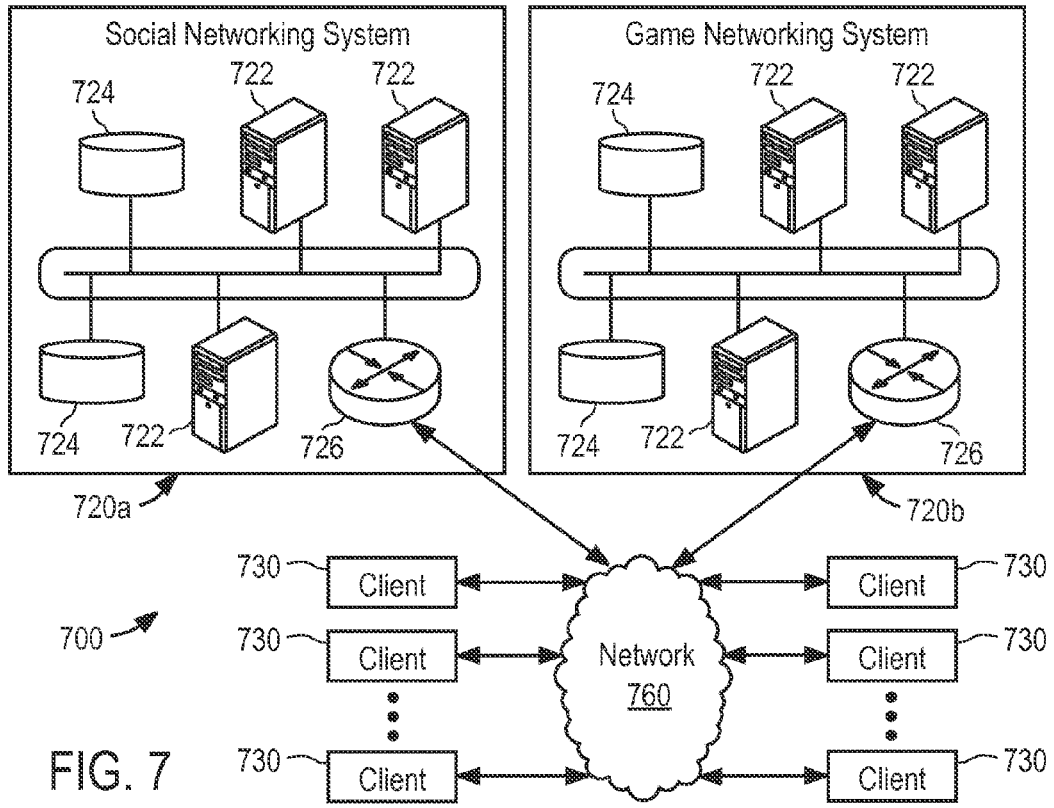
FIG. 7 illustrates an example network environment.

Particular embodiments may operate in a wide area network environment, such as the Internet, including multiple network addressable systems. FIG. 7 illustrates an example network environment, in which various example embodiments may operate. Network cloud 760 generally represents one or more interconnected networks, over which the systems and hosts described herein can communicate. Network cloud 760 may include packet-based wide area networks (such as the Internet), private networks, wireless networks, satellite networks, cellular networks, paging networks, and the like. As FIG. 7 illustrates, particular embodiments may operate in a network environment comprising one or more networking systems, such as social networking system 720a, game networking system 720b, and one or more client systems 730. The components of social networking system 720a and game networking system 720b operate analogously; as such, hereinafter they may be referred to simply at networking system 720. Client systems 730 are operably connected to the network environment via a network service provider, a wireless carrier, or any other suitable means.

Networking system 720 is a network addressable system that, in various example embodiments, comprises one or more physical servers 722 and data stores 724. The one or more physical servers 722 are operably connected to computer network 760 via, by way of example, a set of routers and/or networking switches 726. In an example embodiment, the functionality hosted by the one or more physical servers 722 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 722 may host functionality directed to the operations of networking system 720. Hereinafter servers 722 may be referred to as server 722, although server 722 may include numerous servers hosting, for example, networking system 720, as well as other content distribution servers, data stores, and databases. Data store 724 may store content and data relating to, and enabling, operation of networking system 720 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, and the like. Logically, data store 724 corresponds to one or more of a variety of separate and integrated databases, such as relational databases and object-oriented databases, that maintain information as an integrated collection of logically related records or files stored on one or more physical systems. Structurally, data store 724 may generally include one or more of a large class of data storage and management systems. In particular embodiments, data store 724 may be implemented by any suitable physical system(s) including components, such as one or more database servers, mass storage media, media library systems, storage area networks, data storage clouds, and the like. In one example embodiment, data store 724 includes one or more servers, databases (e.g., MySQL), and/or data warehouses. Data store 724 may include data associated with different networking system 720 users and/or client systems 730.

Client system 730 is generally a computer or computing device including functionality for communicating (e.g., remotely) over a computer network. Client system 730 may be a desktop computer, laptop computer, personal digital assistant (PDA), in- or out-of-car navigation system, smart phone or other cellular or mobile phone, or mobile gaming device, among other suitable computing devices. Client system 730 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 730 to enter addresses of specific network resources to be retrieved, such as resources hosted by networking system 720. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 730 desires to view a particular webpage (hereinafter also referred to as a target structured document) hosted by networking system 720, the user's web browser, or other document rendering engine or suitable client application, formulates and transmits a request to networking system 720. The request generally includes a URL or other document identifier as well as metadata or other information. By way of example, the request may include information identifying the user, such as a user ID, as well as information identifying or characterizing the web browser or operating system running on the user's client computing device 730. The request may also include location information identifying a geographic location of the user's client system or a logical network location of the user's client system. The request may also include a timestamp identifying when the request was transmitted.

Although the example network environment described above and illustrated in FIG. 7 is described with respect to social networking system 720a and game networking system 720b, this disclosure encompasses any suitable network environment using any suitable systems. As an example and not by way of limitation, the network environment may include online media systems, online reviewing systems, online search engines, online advertising systems, or any combination of two or more such systems.

Figure 8:
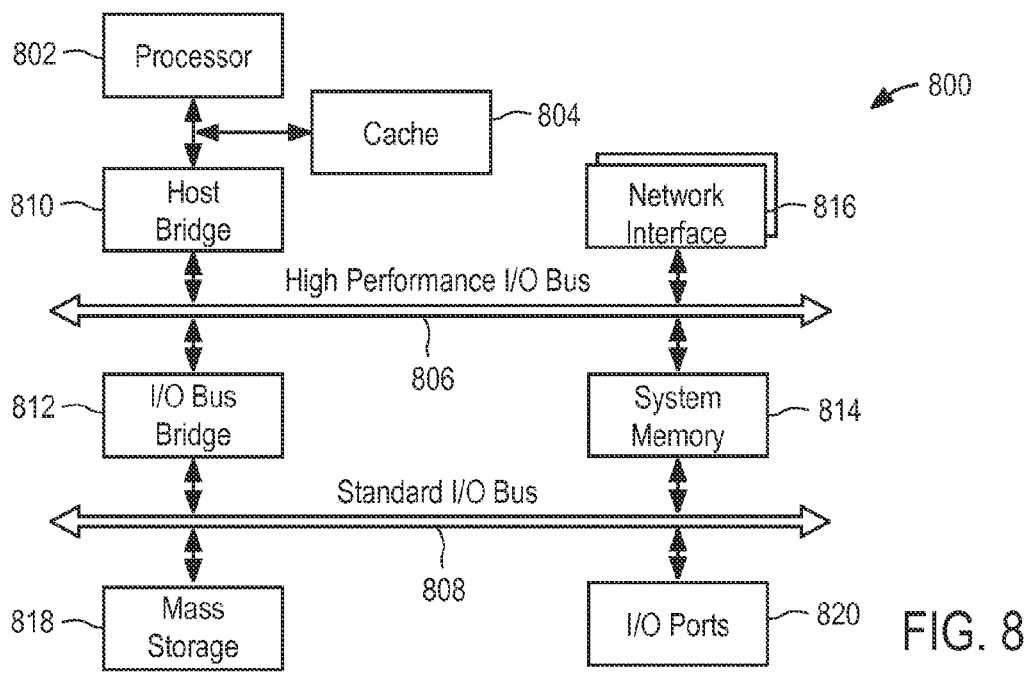
FIG. 8 illustrates an example computing system architecture.

FIG. 8 illustrates an example computing system architecture, which may be used to implement a server 722 or a client system 730. In one embodiment, a hardware system 800 comprises a processor 802, a cache memory 804, and one or more executable modules and drivers, stored on a tangible computer readable medium, directed to the functions described herein. Additionally, hardware system 800 may include a high performance input/output (I/O) bus 806 and a standard I/O bus 808. A host bridge 810 may couple processor 802 to high performance I/O bus 806, whereas I/O bus bridge 812 couples the two buses 806 and 808 to each other. A system memory 814 and one or more network/communication interfaces 816 may couple to bus 806. Hardware system 800 may further include video memory (not shown) and a display device coupled to the video memory. Mass storage 818 and I/O ports 820 may couple to bus 808. Hardware system 800 may optionally include a keyboard, a pointing device, and a display device (not shown) coupled to bus 808. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 800 are described in greater detail below. In particular, network interface 816 provides communication between hardware system 800 and any of a wide range of networks, such as an Ethernet (e.g., IEEE 802.3) network, a backplane, and so forth. Mass storage 818 provides permanent storage for the data and programming instructions to perform the above-described functions implemented in servers 722, whereas system memory 814 (e.g., DRAM) provides temporary storage for the data and programming instructions when executed by processor 802. I/O ports 820 are one or more serial and/or parallel communication ports that provide communication between additional peripheral devices, which may be coupled to hardware system 800.

Hardware system 800 may include a variety of system architectures and various components of hardware system 800 may be rearranged. For example, cache 804 may be on-chip with processor 802. Alternatively, cache 804 and processor 802 may be packed together as a "processor module," with processor 802 being referred to as the "processor core." Furthermore, certain embodiments of the present disclosure may not require nor include all of the above components. For example, the peripheral devices shown coupled to standard I/O bus 808 may couple to high performance I/O bus 806. In addition, in some embodiments, only a single bus may exist, with the components of hardware system 800 being coupled to the single bus. Furthermore, hardware system 800 may include additional components, such as additional processors, storage devices, or memories.

An operating system manages and controls the operation of hardware system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, and the like), that makes API calls directly to a server. Still further, while the embodiments described above operate with business-related virtual objects (such as stores and restaurants), the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A computer-implemented method comprising:
   determining a start time of an online social game contest requiring at least one game-specific activity performed within each of a plurality of continuous online social games, wherein each of the continuous online social games has no defined end, the start time associated with the online social game contest occurring after a beginning of at least one of the plurality of continuous online social games,
   wherein the plurality of continuous online social games includes at least an online farming simulation game with a corresponding farming game-specific activity of the online social game contest comprises planting a required amount of virtual crops;

wherein the plurality of continuous online social games further includes an online city simulation game with a corresponding city game-specific activity of the online social game contest comprises building a required number of a type of virtual buildings;

determining an end point of the online social game contest comprising detecting a first completion by a user in the online social game contest of each respective game-specific activity in each of the plurality of continuous online social games included in the online social game contest;

identifying a plurality of users to participate in the online social game contest;

in an automated process using one or more computer processors, initiating the online social game contest at the start time, each of the plurality of users having a separate online social game environment for each of the plurality of continuous online social games in which to participate in the online social game contest, each separate online social game environment comprising a respective virtual game world populatable with a plurality virtual in-game objects, each virtual game world having a separate game world state that is variable in response to performance of user-controlled in-game actions on one or more virtual in-game objects in the game world;

determining, using the one or more computer processors, whether the online social game contest has reached the end point of the online social game contest; and ending the online social game contest responsive to reaching the end point of the online social game contest.

2. The computer-implemented method of claim 1, further comprising:

accessing a scoring process for the online social game contest; and determining a winner of the online social game contest responsive to ending the online social game contest based on the first completion, the winner determined based on the scoring process for the online social game contest.

3. The computer-implemented method of claim 2, wherein the scoring process for the online social game contest is based on multiple metrics of an online social game implemented in the online social game contest.

4. The computer-implemented method of claim 1, wherein the ending of the online social game contest is further responsive to expiration of a predetermined time period associated with the online social game contest.

5. The computer-implemented method of claim 1, further comprising separating the plurality of users participating in the online social game contest into a plurality of teams.

6. The computer-implemented method of claim 5, further comprising granting access to each user on a particular team to a pool of shared game resources associated with the particular team.

7. The computer-implemented method of claim 5, wherein the determining of whether the online social game contest has reached the end point associated with the online social game contest is based on the aggregated performance of all users on the particular team.

8. The computer-implemented method of claim 1, further comprising:

accessing initial settings associated with the online social game contest; and configuring the online social game contest prior to initiating the online social game contest, each of the plurality of users starting the online social game contest with the same initial settings.

9. The computer-implemented method of claim 1, wherein a first user can share game assets associated with the first user's game environment with a second user for application in the second user's game environment.

10. An apparatus comprising:

an interface to communicate with users in an online social game contest;

a memory to store data associated with the online social game contest; and one or more processors coupled to the interface and the memory, the one or more processors configured to:

identify a start time of an online social game contest requiring at least one game-specific activity performed within each of a plurality of continuous online social games, wherein each of the continuous online social games has no defined end, the start time associated with the online social game contest occurring after a beginning of at least one of the plurality of continuous online social games;

identify an end point of the online social game contest comprising detecting a first completion by a user in the online social game contest of each respective game-specific activity in each of the plurality of continuous online social games included in the online social game contest, wherein the plurality of continuous online social games includes at least an online farming simulation game with a corresponding farming game-specific activity of the online social game contest comprises planting a required amount of virtual crops;

wherein the plurality of continuous online social games further includes an online city simulation game with a corresponding city game-specific activity of the online social game contest comprises building a required number of a type of virtual buildings;

invite a plurality of users to participate in the online social game contest;

initiate the online social game contest at the start time, each of the plurality of users having a separate online social game environment for each of the plurality of continuous online social games in which to participate in the online social game contest, each separate online social game environment comprising a respective virtual game world populatable with a plurality virtual in-game objects, each virtual game world having a separate game world state that is variable in response to performance of user-controlled in-game actions on one or more virtual in-game objects in the game world;

determine whether the online social game contest has reached the end point associated with the online social game contest; and end the online social game contest responsive to reaching the end point associated with the online social game contest.

11. The apparatus of claim 10, the one or more processors further configured to:

access a scoring process for the online social game contest; and determine a winner of the online social game contest responsive to reaching the end point based on the first completion, the winner determined based on the scoring process for the online social game contest.

12. The apparatus of claim 10, the one or more processors further configured to:
- access a scoring process for the online social game contest; and
- determine a plurality of winners of the online social game contest responsive to reaching the end point, each of the plurality of winners determined based on a different metric of an online social game implemented in the online social game contest.

13. The apparatus of claim 10, wherein the plurality of contest participants are separated into a plurality of teams that compete in the online social game contest.

14. The apparatus of claim 13, wherein each contest participant on a particular team has access to a pool of shared game resources associated with the particular team.

15. A non-transitory computer-readable medium storing executable instructions thereon, which, when executed by a processor, cause the processor to perform operations comprising:
- determining a start time of an online social game contest requiring at least one game-specific activity performed within each of a plurality of continuous online social games, wherein each of the continuous online social games has no defined end, the start time associated with the online social game contest occurring after a beginning of at least one of the plurality of continuous online social games;
- determining an end point of the online social game contest comprising detecting a first completion by a user in the online social game contest of each respective game-specific activity in each of the plurality of continuous online social games included in the online social game contest,
  wherein the plurality of continuous online social games includes at least an online farming simulation game with a corresponding farming game-specific activity of the online social game contest comprises planting a required amount of virtual crops;
  wherein the plurality of continuous online social games further includes an online city simulation game with a corresponding city game-specific activity of the online social game contest comprises building a required number of a type of virtual buildings;
- identifying a plurality of users to participate in the online social game contest, each of the plurality of users having a separate online social game environment for each of the plurality of continuous online social games in which to participate in the online social game contest, each separate online social game environment comprising a respective virtual game world populatable with a plurality virtual in-game objects, each virtual game world having a separate game world state that is variable in response to performance of user-controlled in-game actions on one or more virtual in-game objects in the game world;
- determining, using the one or more computer processors, whether the online social game contest has reached the end point of the online social game contest; and
- ending the online social game contest responsive to reaching the end point of the online social game contest.

* * * * *

UNITED STATES PATENT AND TRADEMARK OFFICE
CERTIFICATE OF CORRECTION

PATENT NO. : 9,433,855 B1  
APPLICATION NO. : 13/528741  
DATED : September 6, 2016  
INVENTOR(S) : Keeker et al.

Page 1 of 1

It is certified that error appears in the above-identified patent and that said Letters Patent is hereby corrected as shown below:

In the Specification

In Column 6, Line 43, delete ""friends."" and insert --"friends,"--, therefor

Signed and Sealed this  
Thirteenth Day of March, 2018

Andrei Iancu  
*Director of the United States Patent and Trademark Office*